United States Patent [19]

Yamashita

[11] Patent Number: 5,714,813
[45] Date of Patent: Feb. 3, 1998

[54] RETURN-TO-ORIGIN MECHANISM IN MOTOR ACTUATOR

[75] Inventor: Toshiya Yamashita, Kohnan-machi, Japan

[73] Assignee: Zexel Corporation, Tokyo, Japan

[21] Appl. No.: 763,956

[22] Filed: Dec. 11, 1996

[30] Foreign Application Priority Data

Dec. 20, 1995 [JP] Japan .................. 7-348530

[51] Int. Cl.⁶ .................. H02K 7/00; H02K 5/04
[52] U.S. Cl. .................. 310/75 R; 310/77; 310/49 R; 310/89; 310/66; 74/526
[58] Field of Search .................. 74/526; 310/77, 310/75 R, 49 R, 89, 66, 67 R, 92, 96

[56] References Cited

U.S. PATENT DOCUMENTS

| | | | |
|---|---|---|---|
| 2,351,997 | 6/1944 | Morrill | 310/77 |
| 2,528,489 | 11/1950 | Bednash et al. | 310/77 |
| 2,883,634 | 4/1959 | Origoni et al. | 74/526 |
| 2,950,424 | 8/1960 | Smith et al. | 74/526 |
| 3,076,905 | 2/1963 | Watson | 310/77 |
| 3,783,312 | 1/1974 | Schindel et al. | 310/77 |
| 4,183,257 | 1/1980 | Lovenduski | 77/526 |
| 4,338,747 | 7/1982 | Hess et al. | 74/526 |
| 4,499,389 | 2/1985 | Hoche | 310/49 R |
| 4,501,981 | 2/1985 | Hansen | 310/49 R |
| 4,702,123 | 10/1987 | Hirao et al. | 74/526 |
| 4,893,038 | 1/1990 | Miyazawa | 310/83 |
| 4,973,867 | 11/1990 | Sudler | 310/75 R |
| 5,070,266 | 12/1991 | Janczak et al. | 310/77 |
| 5,113,107 | 5/1992 | Atsumi et al. | 310/49 R |
| 5,144,858 | 9/1992 | Funk | 74/526 |

FOREIGN PATENT DOCUMENTS

| | | | |
|---|---|---|---|
| 63-67402 | 3/1988 | Japan | 74/526 |
| 3-14955 | 1/1991 | Japan | 74/526 |
| 5-289763 | 11/1993 | Japan | 74/526 |

*Primary Examiner*—Steven L. Stephan
*Assistant Examiner*—B. Mullins
*Attorney, Agent, or Firm*—Wenderoth, Lind & Ponack

[57] ABSTRACT

An actuator lever 3 has one of its opposite ends fixedly mounted on an output shaft 4 which extends upward from an upper surface 2a of an actuator casing 2. The other end of the actuator lever 3 has its lower surface fixed to a stopper 8. In operation, the stopper 8 abuts against a vertical barrier 6a in a shoulder portion 6 of the actuator casing 2 to define a start position or origin of rotational motion of the actuator in its return stroke.

5 Claims, 5 Drawing Sheets

FIG. 2
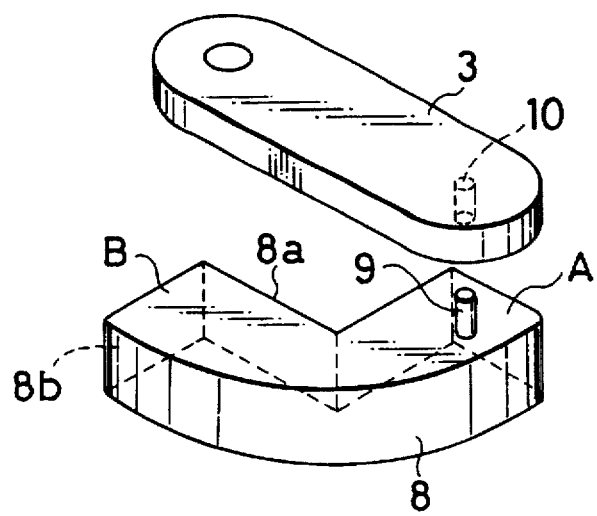
FIG. 3(A)  FIG.(B)
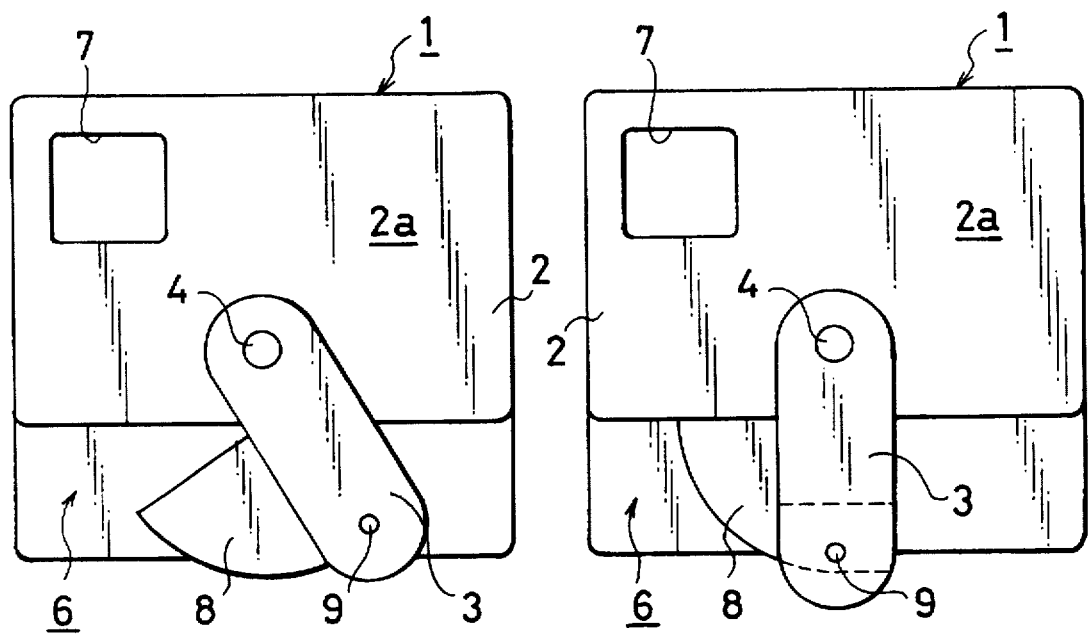

RETURN-TO-ORIGIN MECHANISM IN MOTOR ACTUATOR

BACKGROUND OF THE INVENTION

1. Field of the Invention

The present invention relates to a return-to-origin mechanism in a motor actuator for returning in rotational motion of the motor actuator, the motor actuator to its start position or origin, and more particularly to a return mechanism in a motor actuator using a stepping motor, in which the return-to-origin mechanism is simplified in construction and improved in reliability.

2. Description of the Prior Art

Motor actuators are used as drive units in various systems to convert torque generated in motors into desired translational, rotational and like mechanical motions through appropriate motion converters such as linkages and like mechanisms.

Of these motor actuators, one using a stepping motor, which is angularly positioned in rotational motion at a desired point through a so-called open-loop control process, should have a start point called the origin in its rotational motion. To determine the start point as the origin of the rotational motion, a number of attempts have been made.

One of these attempts is shown in FIG. 8. In this first attempt, as shown in the figure, a stopper 22 is directly fixed to a shaft 21 of a gear 20 in a motor actuator so as to operatively abut against a corresponding counter stopper (not shown) at a specific point inside the actuator to define the above start point or origin, which forms a return-to-origin mechanism for the motor actuator. Through this mechanism, rotational speed of an output shaft of a motor of the actuator is governed to be a desired value.

In a second attempt, there is employed a linkage designed to be locked up at a position of the origin. More specifically, as shown in FIG. 9, in such second attempt, a free end of a lever 23a of a motor actuator 23 is rotatably connected with a corresponding free end of a sub-lever 24a of a linkage 24 through an appropriate connecting rod. In operation, when the lever 23a of the motor actuator 23 reaches a position of the origin, the sub-lever 24a is brought into contact with a stopper 25 so that the linkage 24 is locked up in the position of the origin.

However, as for the first attempt shown in FIG. 8, when the motor actuator is designed to produce a large torque, there is a fear that the stopper and its corresponding counter stopper of the motor actuator are broken due to their abutting each other in operation, and so the first attempt is poor in reliability.

Scaling-up in size of these stoppers can improve the first attempt in mechanical strength or reliability, but there are size limitations in the stoppers, because the motor actuator using these stoppers is a small-sized unit. Consequently, such scaling-up in size of the stoppers fails to improve the first attempt in reliability.

As for the second attempt, since the linkage 24 is poor in rigidity and in integrity as a whole in operation, the second attempt is also poor in reliability in construction.

SUMMARY OF THE INVENTION

It is an object of the present invention to provide a return-to-origin mechanism of a motor actuator in which a stopper and its corresponding counter stopper, defining an origin, abut each other in operation through a relatively large area to reduce the pressure of their area contact in such abutting movement. This improves the mechanism in durability or reliability.

It is another object of the present invention to provide a return-to-origin mechanism of a motor actuator free from any failure of a linkage associated with the actuator.

It is another object of the present invention to provide a return-to-origin mechanism of a motor actuator which is improved with respect to gear stress and mechanical strength in comparison with a conventional return-to-origin mechanism which has a stopper fixedly mounted on a gear installed inside a conventional motor actuator.

It is still another object of the present invention to provide a return-to-origin mechanism of a motor actuator which may easily change the range of rotational movement of its actuator lever.

According to a first aspect of the present invention, the above objects of the present invention are accomplished by providing a return-to-origin mechanism in a motor actuator for returning, by rotational motion the actuator to its start position or origin. The actuator is provided with an actuator casing and a motor having an output shaft. Torque generated in the motor is transmitted directly or indirectly through a gear train to the output shaft. An actuator lever is fixedly mounted.

The start position or origin is adjustable.

The actuator lever is provided with a stopper which abuts against the actuator casing in the start position or origin.

According to a second aspect of the present invention, the above objects of the present invention are accomplished by providing the return-to-origin mechanism in the motor actuator as set forth in the first aspect of the present invention, wherein the actuator casing is provided with a shoulder portion extending along its side portion. The output shaft extends outwardly from the actuator casing in the vicinity of the shoulder portion thereof. The actuator lever has one of its opposite ends fixedly mounted on the output shaft and the other of the opposite ends passes by an upper side of the shoulder portion of the actuator casing. The shoulder portion of the actuator casing is provided with a curved portion which is so formed as to accommodate rotational motion of the actuator lever.

According to a third aspect of the present invention, the above objects of the present invention are accomplished by providing the return-to-origin mechanism in-the motor actuator as set forth in the first aspect of the present invention, wherein the output shaft extends outwardly from a flat casing surface of the actuator casing. The stopper is provided with an abutting surface through which the stopper abuts against a flat shoulder surface of a shoulder portion of the actuator casing, the flat shoulder surface being perpendicular to the flat casing surface. The abutting surface of the stopper is disposed beside the actuator lever.

According to a fourth aspect of the present invention, the above objects of the present invention are accomplished by providing the return-to-origin mechanism in the motor actuator as set forth in the third aspect of the present invention, wherein an angle which the abutting surface of the stopper forms with a longitudinal axis of the actuator lever is set so as to accommodate the start position or origin.

In the return-to-origin mechanism of the present invention having the above construction, it is possible to easily use a stopper which has a lot more abutting area than a conventional stopper. Consequently, in a motor actuator, the present invention may realize a return-to-origin mechanism that is excellent in mechanical strength and reliability.

BRIEF DESCRIPTION OF THE DRAWINGS

FIG. 2 is a perspective view of each of an actuator lever and the stopper, both used in the return-to-origin mechanism of the present invention as shown in FIG. 1;

FIGS. 3(A) and 3(B) are plan views of the return-to-origin mechanism of the present invention shown in FIG. 1, in which FIG. 3(A) shows the actuator lever in a position near the start position or origin, and FIG. 3(B) shows the actuator lever having reached the start position or origin;

DESCRIPTION OF THE PREFERRED EMBODIMENTS

Hereinbelow, the present invention will be described in detail with reference to the accompanying drawings.

Incidentally, it should be understood that there is no intent to limit the present invention to the embodiments disclosed hereinbelow. On the contrary, the invention covers all modifications, equivalents, and alternatives falling within the spirit and scope of the invention as defined by the appended claims.

Figure 1:
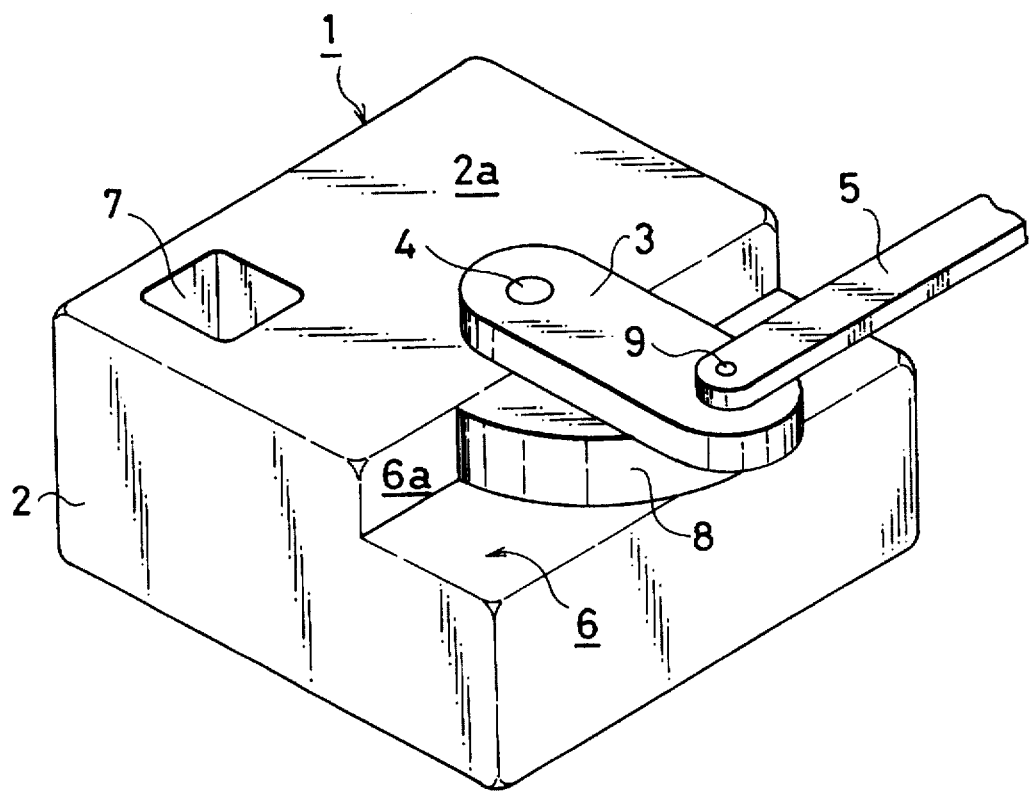
FIG. 1 is a perspective view of a first embodiment of the return-to-origin mechanism of the present invention in a motor actuator.

FIGS. 1 to 3 show a first embodiment of the return-to-origin mechanism of the present invention.

As shown in the figures, a motor actuator 1 is provided with an actuator casing 2. A stepping motor (not shown) is mounted inside the actuator casing 2. If necessary, an associated reduction gear train for reducing rotational speed of the motor is also mounted inside the actuator casing 2 together with the motor. Disposed over an upper surface 2a of the actuator casing 2 is an actuator lever 3, which is connected with an output shaft 4 of the stepping motor, directly or indirectly, through the associated reduction gear train described above.

More specifically, the actuator lever 3 has one of its opposite ends fixedly mounted on the output shaft 4 of the motor actuator 1, and the other, i.e., free end of its opposite ends connected with an end of a link member 5 of a linkage (not shown) through a pivot pin 9. This pin 9 is fixedly mounted in the free end of the actuator lever 3, as shown in FIG. 1. Consequently, rotational motion of the actuator lever 3 is transmitted through the link member 5 to the linkage (not shown) and converted therein into a desired motion which is imparted to an appropriate driven element (not shown).

On the other hand, as is clear from FIG. 1, the actuator casing 2 is provided with a shoulder portion 6 which extends linearly along a side portion of a rectangular solid of the actuator casing 2. The output shaft 4 extends outwardly from the upper surface 2a of the actuator casing 2 in the vicinity of the shoulder portion 6. Incidentally, the actuator casing 2 is also provided with a concave portion 7 in one of its corner portions, thereby receiving an electrical connector (not shown) therein. Through such connector, the motor actuator 1 is controlled in operation by an external control circuit.

The actuator lever 3 assumes a substantially flat shape, and has its end portion, which is pivoted to the link member 5, extend across the shoulder portion 6. The other end of the actuator lever 3 is fixedly mounted on the output shaft 4 as described above.

A stopper 8 is fixedly mounted on a lower surface of the actuator lever 3 in a condition in which the stopper 8 is adjacent to the shoulder portion 6 of the actuator casing 2. In operation, as shown in FIG. 1, the stopper 8 abuts against a vertical barrier 6a of this shoulder portion 6 when the actuator lever 3 reaches a start position or origin of the motor actuator 1.

More specifically, in the first embodiment of the present invention, for example, as shown in FIGS. 1 and 3(B), the actuator lever 3 has its longitudinal axis perpendicular to that of the vertical barrier 6a of the shoulder portion 6 in the start position or origin of the motor actuator 1. Incidentally, in FIGS. 2, 3(A), 3(B) and 4 to 7, the link member 5 is omitted for perspicuity.

As is clear from FIGS. 2 and 3(B), the stopper 8 has the shape of a substantially quarter of a circle in plan view, except for its notched portion which is substantially equal in width to the actuator lever 3 in plan view, as shown in FIGS. 3(B). In thickness, the stopper 8 is substantially equal to the vertical barrier 6a of the shoulder portion 6 of the actuator casing 2, as is clear from FIG. 1.

Further, the stopper 8 is provided with a fixed pivot pin 9 in its portion "A". The pin 9 extends upwardly from an upper surface of the portion "A" which is bonded to the lower surface of the actuator lever 3 through an adhesive and like connecting means in a condition in which the pivot pin 9 of the stopper 8 is inserted into a corresponding through-hole 10 of the actuator lever 3. Through an upper portion of the pivot pin 9 extending upwardly from the upper surface of the actuator lever 3, the link member 5 has one of its opposite ends pivoted to the free end of the actuator lever 3, as shown in FIG. 1.

Incidentally, in the first embodiment described above, although the pivot pin 9 entirely assumes a round shape in cross section, it is also possible for the pivot pin 9 to assume any other shape, such as a semicircular shape and the like, in cross section in its lower portion engaging with both the actuator lever 3 and the stopper 8. When such lower portion of the pivot pin 9 assumes a semicircular shape in cross section, it is natural that the corresponding through-hole 10 of the actuator lever 3 also assumes a corresponding semicircular shape in cross section.

Further, as shown in FIGS. 1, 2, 3(A) and 3(B), in a condition in which the stopper 8 has its portion "A" bonded to the lower surface of the actuator lever 3, the stopper 8 has its portion B projected to one side.

Formed in this portion B is an abutting surface 8b shown in dotted lines in FIG. 2. The abutting surface 8b lies in a plane perpendicular to the longitudinal axis of the actuator lever 3, and abuts against the vertical barrier 6a of the shoulder portion 6 in the actuator casing 2 when the actuator lever 3 reaches the start position or origin of the motor actuator 1.

In operation of the return-to-origin mechanism of the present invention having the above construction, the motor actuator 1 is controlled through a so-called open-loop control process to determine a position of the actuator lever 3. More specifically, the motor actuator 1 is not controlled in a feedback mode in which a position of a driven element driven and controlled by the motor actuator 1 through a linkage (not shown) is fed back. In the present invention, the motor actuator 1 is controlled as follows: namely, each time the actuator lever 3 moves to its desired position, the actuator lever 3 is returns to the start position or origin of the motor actuator 1. More specifically, a plurality of pulse signals required to move the actuator lever 3 from the start position or origin to its desired position are supplied from an external circuit (not shown) to a stepping motor (not shown) of the motor actuator 1, so that the actuator lever 3 is moved to its desired position.

Such desired position in rotational motion of the actuator lever 3 is determined based on the start position or origin of the motor actuator 1, in which start position or origin the abutting surface 8b of the stopper 8 abuts against the vertical barrier 6a of the shoulder portion 6 of the actuator casing 2.

For example, when the actuator lever 3 starts its rotational motion from a position shown in FIG. 3(A) to its desired position, the actuator lever 3 is controlled by the external control circuit (not shown) and is temporarily returned to the start position or origin of the motor actuator 1, as shown in FIG. 3(B). Namely, a predetermined number of pulse signals required to move the actuator lever 3 from a position shown in FIG. 3(A) to the start position or origin shown in FIG. 3(B) are supplied from the external control circuit to the motor actuator 1 so that the actuator lever 3 is rotatably driven and returns to the start position or origin. In the first embodiment shown in FIGS. 3(A) and 3(B), the actuator lever 3 rotates clockwise.

In operation, when the longitudinal axis of the actuator lever 3 becomes perpendicular to the vertical barrier 6a of the shoulder portion 6 of the actuator casing 2, the stopper 8 abuts against the vertical barrier 6a to stop its rotational motion so that the start position or origin is determined.

After that, a predetermined number of pulse signals required to move the actuator lever 3 from the start position or origin to a desired position are supplied from the external control circuit to the motor actuator 1 so that the actuator lever 3 is moved to such desired position in rotational motion.

Incidentally, in the first embodiment described above, although the actuator lever 3 and the stopper 8 are separate members, lever 3 and stopper 8 can be integrally formed into a single member (3, 8).

Now, a second embodiment of the present invention will be described with reference to FIG. 4.

The second embodiment is different from the first embodiment in the shape of the stopper. More specifically, the stopper 8 used in the first embodiment has the shape of a substantially quarter of a circle in plan view, except for its notched portion 8a. A stopper 11 used in the second embodiment has the shape of a substantially rectangular solid with a round side and flat opposite vertical sides, as shown in FIG. 4. The stopper 11 is integrally formed with the actuator lever 3.

Figure 4:
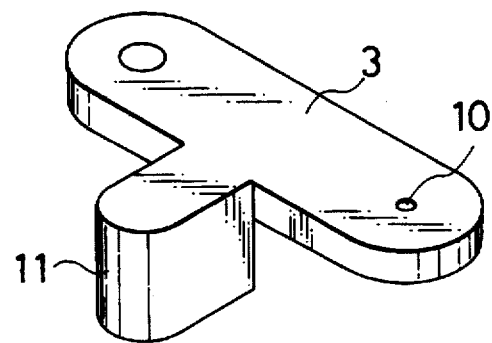
FIG. 4 is a perspective view of a stopper used in a second embodiment of a return-to-origin mechanism of the present invention.

As is clear from FIG. 4, the stopper 11 has an upper portion of the flat one of its opposite vertical sides integrally connected with a predetermined portion of a longitudinal side surface of the actuator lever 3, and projects to the side.

The predetermined portion of the longitudinal side surface of the actuator lever 3 determines the start position or origin of the motor actuator 1 in operation. In the second embodiment shown in FIG. 4, the actuator lever 3 reaches the start position or origin of the motor actuator 1 when the longitudinal axis of the lever 3 is perpendicular to the vertical barrier 6a of the shoulder portion 6 in the actuator casing 2. At this time, the stopper 11 abuts against the vertical barrier 6a of the shoulder portion 6.

Incidentally, the stopper 11 provides a sufficient connecting area between the stopper 11 and the actuator lever 3 to withstand stress occurring when the stopper 11 hits the barrier 6a in the start position or origin of the motor actuator 1.

Further, in the second embodiment, although the stopper 11 is integrally formed with the actuator lever 3, it is also possible to separately form the stopper 11 and the actuator lever 3. The thickness or height of the stopper 11 may vary within a range of up to the height of the vertical barrier 6a of the shoulder portion 6 in the actuator casing 2 (see FIG. 1).

Figure 5:
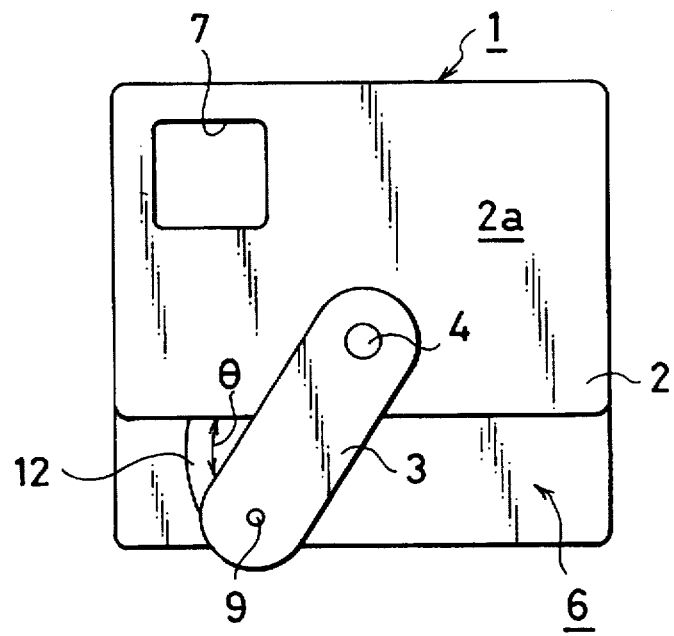
FIG. 5 is a plan view of the stopper used in a third embodiment of a return-to-origin mechanism of the present invention.
Figure 6:
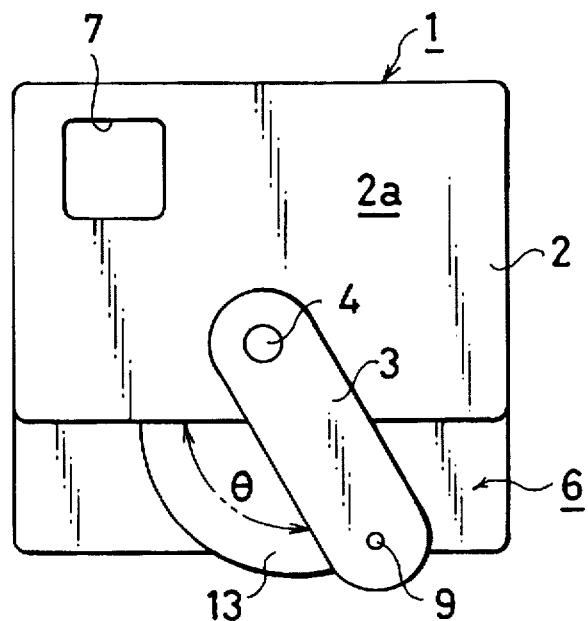
FIG. 6 is a plan view of another embodiment of the stopper used in the third embodiment of the return-to-origin mechanism of the present invention.

FIGS. 5 and 6 show a third embodiment of the present invention, in which the link member 5 (shown in FIG. 1) is omitted for perspicuity.

In this third embodiment, the start position or origin of the motor actuator 1 or actuator lever 3 is different in position from that of the first embodiment.

More specifically, in the first embodiment shown in FIGS. 1, 2, 3(A) and 3(B), the actuator lever 3 reaches the start position or origin of the motor actuator 1 when the longitudinal axis of the actuator lever 3 is perpendicular to the vertical barrier 6a of the shoulder portion 6 in the actuator casing 2. In contrast with this, in the third embodiment shown in FIGS. 5 and 6, an angle formed between a surface of the vertical barrier 6a of the shoulder portion 6, i.e., the abutting surface of a stopper 12 (or 13) and the longitudinal axis of the actuator lever 3, is variable to enable a user to change the start position or origin of the motor actuator 1 or actuator lever 3.

For example, when the user wants to move the start position or origin of the actuator lever 3 clockwise to a new start position as shown in FIG. 5, the shape of the stopper 12 is so determined as to have an angle "theta", which is formed between the abutting surface of the stopper 12 and the longitudinal axis of the actuator lever 3, and which is an acute angle.

In this connection, for example, the angle "theta" is 90 degrees in the first embodiment. When the angle "theta" equal to 90 degrees is used as a reference angle, a desired angle for the new start position or origin of the motor actuator 1 shown in FIG. 5 is determined by subtracting an angle of "theta 1" from the above reference angle, wherein the angle "theta 1" corresponds to an extension of the range of rotational motion of the actuator lever 3.

On the other hand, when the user wants to decrease the range of rotational motion of the actuator lever 3, as shown in FIG. 6, the shape of the stopper 13 is so determined as to have an angle "theta" increased to be an obtuse one. Incidentally, in this case, when the angle "theta" equal to 90 degrees is used as a reference angle, a desired angle for a new start position or origin of the motor actuator 1 shown in FIG. 6 is determined by adding an angle of "theta 2" to the above reference angle, wherein the angle "theta 2" corresponds to a decrease of the range of rotational motion of the actuator lever 3.

Figure 7:
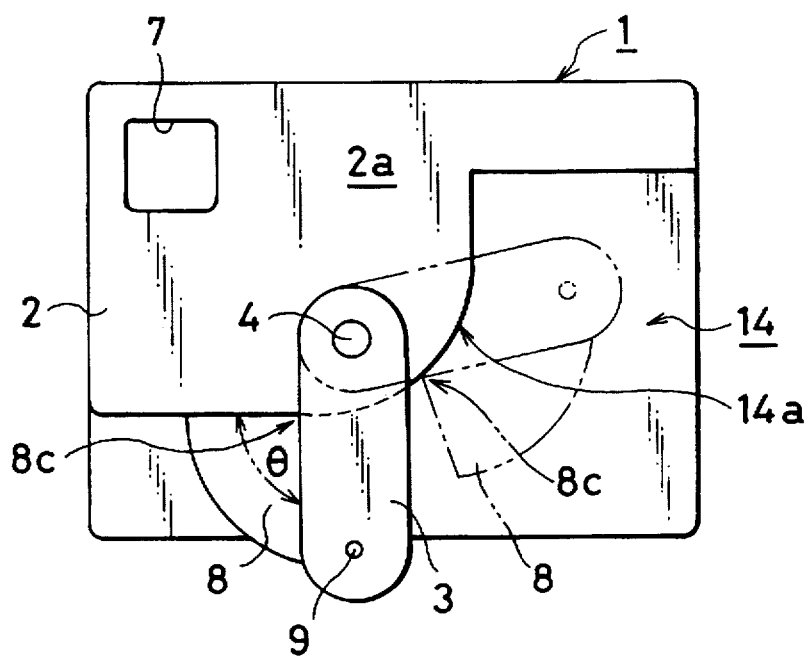
FIG. 7 is a plan view of an actuator casing used in a fourth embodiment of the return-to-origin mechanism of the present invention.
Figure 8:
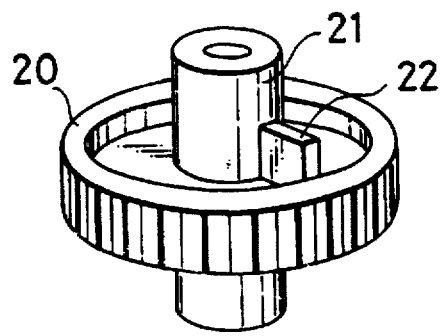
FIG. 8 is a perspective view of a conventional return-to-origin mechanism of a gear-lock type for a motor actuator.
Figure 9:
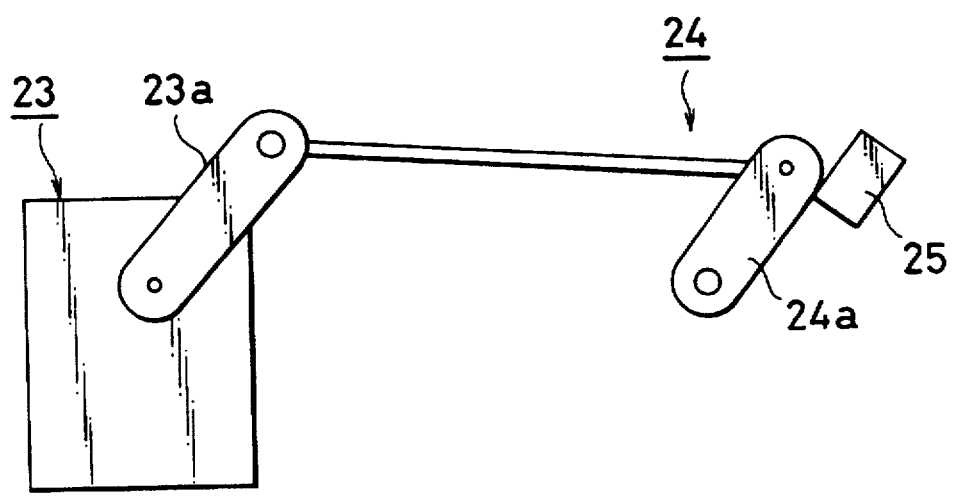
FIG. 9 is a plan view of another conventional return-to-origin mechanism in a motor actuator, which mechanism uses a linkage to define the start position or origin of the motor actuator.

FIG. 7 shows a fourth embodiment of the present invention. In this fourth embodiment, the parts which are the same as ones in the above embodiments have been given the same reference numerals and characters, and, therefore are not further explained. The link member 5 (shown in FIG. 5) is omitted for perspicuity in the fourth embodiment.

In the fourth embodiment shown in FIG. 7, the shoulder portion 14 of the actuator casing 2 is changed in shape to enlarge the range of rotational motion of the actuator lever 3.

More specifically, although the shoulder portion 6 is linearly formed along a side portion of the actuator casing 2 in the first embodiment, the fourth embodiment partially alters the shape of such shoulder portion 6 of the actuator casing 2 by bending the shoulder portion 6 along the path of rotational motion of the actuator lever 3 so as to form a shoulder portion 14 of the actuator casing 2, as shown in FIG. 7.

As is clear from FIG. 7, the fourth embodiment uses the same start position or origin of the motor actuator 1 as that in the first embodiment. In other words, in the fourth embodiment shown in FIG. 7, the angle "theta" formed between the abutting surface of the stopper 8 and the longitudinal axis of the actuator lever 3 is 90 degrees as is in the first embodiment shown in FIG. 1.

In operation, when the actuator lever 3 rotates counterclockwise to reach its most distant position, a corner portion 8c of the stopper 8 hits or abuts against the vertical barrier of the shoulder portion 14, the barrier being perpendicular to the paper in FIG. 7. More specifically, in the fourth embodiment, the corner portion 8c of the stopper 8 bits a curved portion 14a of the vertical barrier of the shoulder portion 14 in the actuator casing 2 (as shown in phantom lines in FIG. 7) when the actuator lever 3 reaches its most distant position.

When the user wants to further move the actuator lever 3 counterclockwise beyond the above distant position to enlarge the range of rotational motion of the actuator lever 3, it is necessary to form the curved portion 14a in a position nearer to the output shaft 4 than the position shown in FIG. 7.

As described above, in the present invention having the above construction, the actuator lever of the motor actuator has its stopper abut against the outer wall, i.e., the vertical barrier of the shoulder portion of the actuator casing so that the motor actuator returns to its start position or origin. Consequently, in contrast with the conventional return-to-origin mechanism using the gear provided with the stopper, the present invention enables the stopper of the actuator lever to make a wider area contact with the barrier of the actuator casing, which considerably reduces the stress occurring in the abutting surface of the stopper, thereby realizing a return-to-origin mechanism that is excellent in mechanical strength and reliability in the motor actuator.

Further, in operation of the return-to-origin mechanism of the present invention, since the actuator lever abuts against the actuator casing through the stopper, the mechanism of the present invention is free from linkage failures such as distortions and misalignment inherent in the conventional return-to-origin mechanism using the linkage associated with the stopper. Therefore, according to the present invention, it is possible to provide a reliable return-to-origin mechanism of the motor actuator.

Furthermore, in the present invention, it is possible to change in position the curved portion of the shoulder portion in the actuator casing when the casing is designed and manufactured, which permits the actuator lever to easily change the range of its rotational motion so as to accommodate various needs.

What is claimed is:

1. A motor actuator having a return-to-origin mechanism, comprising:

an actuator casing comprising a flat casing surface and a shoulder portion that extends linearly along a side of said actuator casing, said shoulder portion comprising an upper side and a flat shoulder surface that is perpendicular to said flat casing surface;

a motor in said actuator casing, said motor having an output shaft to which torque generated by said motor can be transmitted, said output shaft extending outwardly from said flat casing surface of said actuator casing adjacent to said shoulder portion of said actuator casing;

an actuator lever fixedly mounted to said output shaft, said actuator lever having opposite ends, one of said opposite ends being fixedly mounted on said output shaft, and the other of said opposite ends extending over said shoulder portion of said actuator casing, said actuator lever having an adjustable origin, and said actuator lever having a longitudinal axis; and a stopper provided with said actuator lever such that said stopper abuts said casing when said actuator lever is at said start position or origin, said stopper comprising an abutting surface that abuts against said flat shoulder surface of said shoulder portion at said origin, said abutting surface being located on one side of said actuator lever, and said abutting surface of said stopper forming an angle with said longitudinal axis of said actuator that is set to correspond to said origin.

2. The motor actuator of claim 1, wherein said flat shoulder surface is planar at least to the extent of a range of motion of said actuator.

3. A motor actuator having a return-to-origin mechanism, comprising:

an actuator casing comprising a flat casing surface and a shoulder portion that extends along a side of said actuator casing, said shoulder portion comprising an upper side and a flat shoulder surface that is perpendicular to said flat casing surface;

a motor in said actuator casing, said motor having an output shaft to which torque generated by said motor can be transmitted, said output shaft extending outwardly from said flat casing surface of said actuator casing adjacent to said shoulder portion of said actuator casing;

an actuator lever fixedly mounted to said output shaft, said actuator lever having opposite ends, one of said opposite ends being fixedly mounted on said output shaft, and the other of said opposite ends extending over said shoulder portion of said actuator casing, said actuator lever having an adjustable origin and a range of motion; and a stopper provided with said actuator lever such that said stopper abuts said casing when said actuator lever is at said origin to define one end of the range of motion, said stopper comprising an abutting surface that abuts against said flat shoulder surface of said shoulder portion at said origin, said abutting surface being located on one side of said actuator lever;

wherein said shoulder portion of said actuator casing further comprises a curved portion positioned adjacent to said flat shoulder surface and within the range of motion of said actuator lever.

4. The motor actuator of claim 3, wherein said curved portion of said shoulder portion is a curved surface perpendicular to said flat casing surface.

5. The motor actuator of claim 4, wherein said actuator lever has a range of motion limited at opposite ends of the range of motion by contact of said stopper with said flat shoulder portion and said curved portion, respectively.

* * * * *

UNITED STATES PATENT AND TRADEMARK OFFICE
CERTIFICATE OF CORRECTION

PATENT NO. : 5,714,813
DATED : February 3, 1998
INVENTOR(S) : Toshiya YAMASHITA

It is certified that error appears in the above-identified patent and that said Letters Patent is hereby corrected as shown below:

At line 16 of column 8, change "actuator that" to --actuator lever that--.

Signed and Sealed this

Twenty-seventh Day of October, 1998

Attest:

BRUCE LEHMAN

Attesting Officer

Commissioner of Patents and Trademarks